May 6, 1958  R. S. STRIMEL  2,833,045
INSTRUMENTATION FOR THE STRAIN TESTING
OF RUBBER OR THE LIKE
Filed March 21, 1955  3 Sheets-Sheet 2
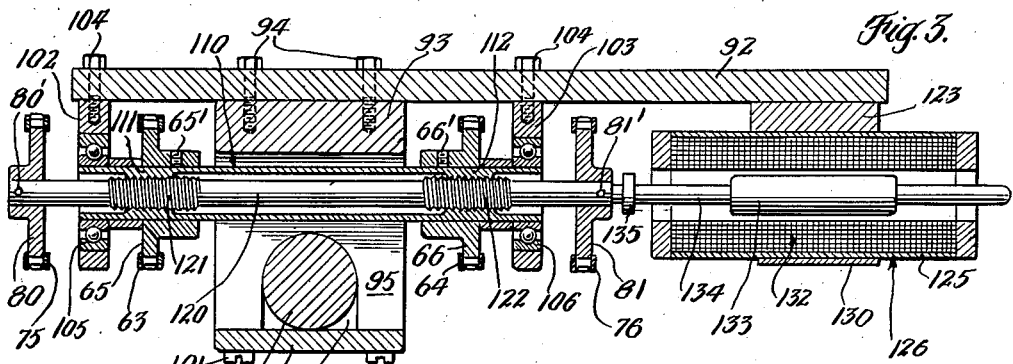
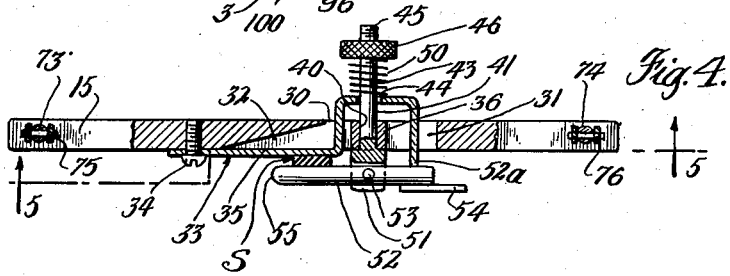
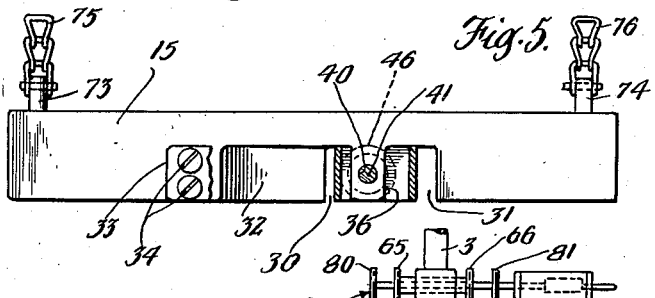
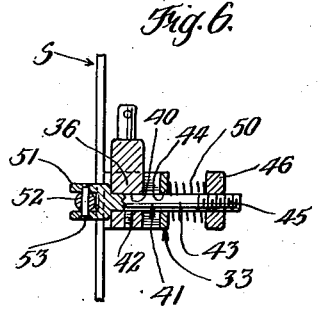
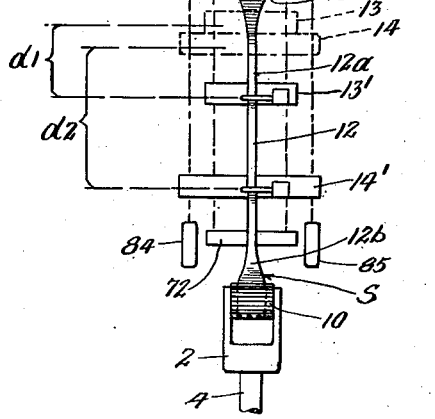
INVENTOR
Robert S. Strimel
BY
Synnestvedt & Lechner
ATTORNEYS May 6, 1958

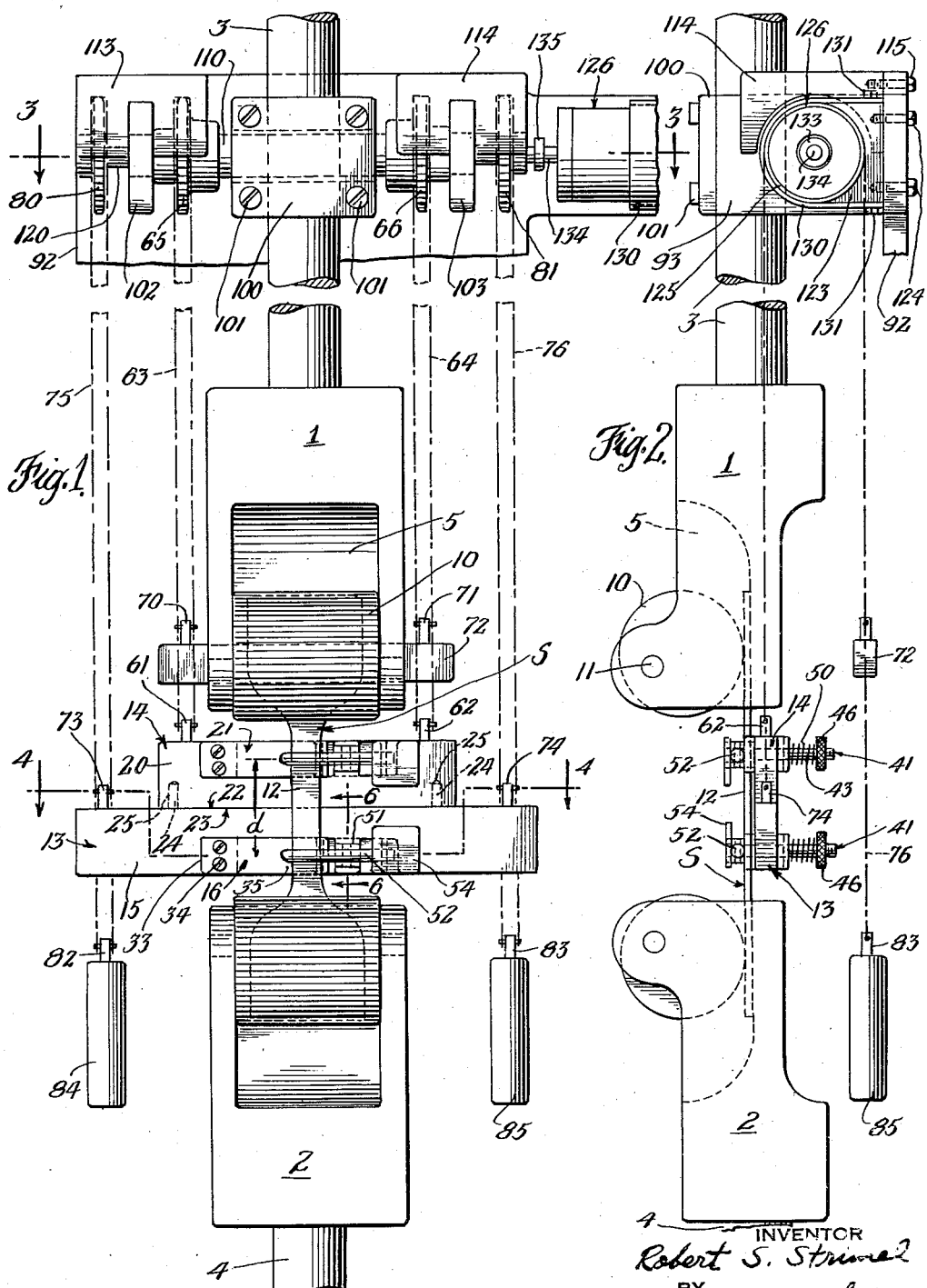

R. S. STRIMEL 2,833,045

INSTRUMENTATION FOR THE STRAIN TESTING
OF RUBBER OR THE LIKE

Filed March 21, 1955

INVENTOR

Robert S. Strimel

BY

Synnestvedt + Lechner

ATTORNEYS

United States Patent Office 2,833,045
Patented May 6, 1958

2,833,045

INSTRUMENTATION FOR THE STRAIN TESTING OF RUBBER OR THE LIKE

Robert S. Strimel, Penllyn, Pa., assignor to Tinius Olsen Testing Machine Company, Willow Grove, Pa., a corporation of Pennsylvania Application March 21, 1955, Serial No. 495,551

16 Claims. (Cl. 33—147)

This invention relates in general to testing equipment and, in particular, relates to instrumentation for measuring the elongation or strain of a specimen of rubber or rubber-like material.

In the testing of rubber or the like, a specimen is secured in grips between the crossheads of a testing machine and strained by causing one crosshead to move relative to the other. The present invention is concerned with apparatus operative to automatically measure the strain of the specimen and to provide a signal for apparatus to automatically record the same.

One of the objects of the invention is to provide in instrumentation for the testing of rubber or the like, strain-following means which is attached to a specimen and moves therewith during the test.

Another object of the invention is to provide in instrumentation for the testing of rubber or the like, means operative to continuously follow the strain from a small initial gauge length to a final separating distance several times said gauge length.

Another object of the invention is to provide in instrumentation for the testing of rubber or the like, two strain-following clamps which are attached to a specimen and movable therewith, together with mechanism to measure the differential movement of the clamps.

Another object of the invention is to provide in instrumentation for the testing of rubber or the like, strain-sensing means secured to and movable with a specimen, together with mechanism to continuously measure the strain and having flexible interconnections with the sensing means.

Another object of the invention is to provide in instrumentation for the testing of rubber or the like, strain-measuring mechanism which, although mechanically connected with a test specimen, imposes virtually no load thereon.

Another object of the invention is to provide in instrumentation for the testing of rubber or the like, flexible drive connections between a strain-measuring device and a strain-sensing device secured to or movable with a test specimen.

Another object of the invention is to provide in instrumentation for the testing of rubber or the like, means to counteract the weight of the sensing device as attached on a test specimen.

Another object of the invention is to provide in instrumentation for the testing of rubber or the like, strain-sensing means constructed whereby specimen gauge length is automatically set.

The manner in which the invention is constructed will be apparent from the following description and drawings wherein:

Figure 1 is a front elevational view partially broken away to condense the figure, and showing in particular a test specimen held in grips with sensing devices attached to the specimen in start position;

Figure 2 is a side elevation of Figure 1 looking toward the left in Figure 1;

Figure 3 is an enlarged plan section on the line 3—3 of Figure 1 and illustrating the details of construction of certain strain-measuring mechanism;

Figure 4 is an enlarged plan section on the line 4—4 of Figure 1 and showing the details of construction of a strain-sensing device, particularly the clamps thereon;

Figure 5 is a sectional view on the line 5—5 of Figure 4;

Figure 6 is an enlarged cross section on the line 6—6 of Figure 1;

Figure 6a is a fragmentary view showing an alternative construction of a clamp plate;

Figure 7 is a diagrammatic front elevational view showing the test specimen in a stretched or elongated condition.

Figure 8:
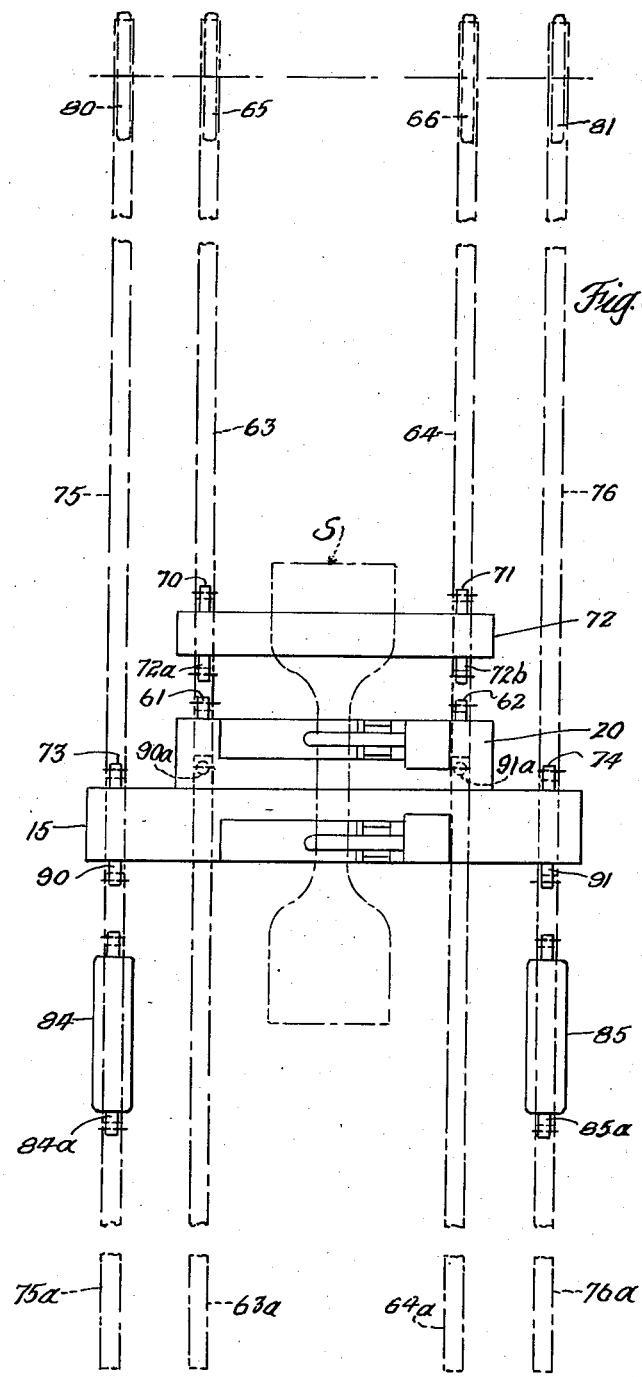
Figures 8 and 9 are views showing the manner in which the flexible elements of the invention are arranged in continuous form.

In Figure 1 the specimen S is seen connected between grips 1 and 2 respectively connected to rods 3 and 4, the rod 3 being secured to the fixed crosshead of the testing machine (not shown) and the rod 4 being connected to the movable crosshead of the testing machine. The grips 1 and 2 may be of any standard type and, as shown, are identical in construction, and the description will be only as to grip 1. The cutout portion 5 carries a serrated roller 10 eccentrically mounted, as indicated at 11. The end of the test specimen is gripped between the back portion 5 and the roller and when the grip is moved, a wedging action takes place so that the end of the specimen is firmly held.

As the grips are moved apart, the center portion 12 of the specimen is elongated, and for the purpose of sensing this elongation or strain, the invention contemplates a sensing device which is adapted to be fixedly secured to the specimen in a manner to be movable therewith. In the preferred form, two of these sensing devices are used and, on Figure 1, are indicated by the numerals 13 and 14.

The sensing device 13 includes an equalizing bar 15, on which is secured a specimen clamp 16. The sensing device 14 includes an equalizing bar 20, on which is secured the specimen clamp 21. The equalizing bars are positioned in the desired relationship when the surfaces 22 and 23 are abutting one another and the locating pins 24—24 on the bar 15 are disposed within the apertures 25—25 of the bar 20.

The structural details of the clamps and the equalizing bars are shown in Figures 4, 5 and 6 and will be explained following. The equalizing bar 15 has, on the lower portion thereof, the apertures 30 and 31, the aperture 30 having a tapered portion 32. The equalizing bar 20 is similarly constructed except that it is shorter in length, and the apertures are located near the top thereof (see Figure 1).

The clamp 16 has a clamp plate generally designated by the numeral 33, which is preferably made of spring steel or the like. The plate is secured to the bar 15 as by screws 34—34. The clamp plate has a clamping surface 35 which extends adjacent the tapered portion 32 of the aperture 30; the plate is then bent into a U shape so that it extends through the aperture 30 to the rear side of the bar and thence through the aperture 31 to the front side of the bar.

In the portion 36 of the bar 15 is an aperture 40, in which is disposed a support 41 secured thereto as by set screw 42. The support has a stud 43 extending through an aperture 44 in the clamp plate 33 and its outer end is threaded as at 45. The adjusting nut 46 is disposed on the threads and a spring 50 bears between the nut and the plate. The forward end of the support 41 is generally yoke-shaped, as indicated at 51, and another clamp plate 52 is pivotally mounted in the yoke as at 53. As seen in Figure 4, the end of the portion of the plate 33 which extends through aperture 31 bears on the clamp plate 52 as at 52a. The plate 52 is provided with a pinch plate 54.

As seen in Figure 4, the specimen S is engaged between the clamp plates 33 and 52. The contact between the plates as at 52a and the location of the pivot 53 are such that the spring-like action of the plate 33 causes the plate 52 to be pivoted so that the end 55 is urged in toward the clamping surface 35. When there is no specimen between the plates, the end 55 contacts the surface 35. When there is a specimen between the plates, the same type of pivoting action obtains, so that effectively the specimen is clamped by forces exerted on both sides. The clamping forces may be augmented by means of the spring 50, the force of which may be adjusted by the nut 46.

The manner in which the sensing member is attached to a specimen is explained following. If the pinch plate 54 is pushed rearwardly, say, by the thumb engaging the plate and a finger engaging the rear face of the equalizing bar 15, the end 55 of the clamp plate 52 moves away from the clamping surface 35 and the device is oriented so that the surface 35 abuts a specimen. With the release of the pinch plate, the clamp plate 52 moves forwardly and the specimen is firmly gripped. The gripping force is such that the sensing device will move and follow the elongation when the specimen is stressed.

It is to be noted here that the clamp plate 52 is in the form of a rod and this gives a line-to-line contact with the specimen. Other forms may be used, such as the generally triangular-shaped plate 52' shown in Figure 6a.

The clamp 21 on the strain-sensing device 14 is identical with clamp 16 and need not be described.

When the specimen is stressed and elongation takes place, the clamps move with the specimen so that the devices 13 and 14 move apart, as illustrated at 13' and 14' in Figure 7, where the space separating the devices is shown to be considerably increased over that of Figure 1 due to the elongation of the portion 12 of the specimen.

Generally speaking, in the strain testing of rubber or rubber-like materials, strain is defined as the extension between bench marks on a specimen produced by a tension force applied to a specimen and is expressed as a percentage of the original distance between the marks. Ordinarily, bench marks on the specimen are placed one or two inches apart and this distance is often times called the gauge length because any means which is used to follow the bench marks during the elongation must be initially separated by a distance equal to the distance between the bench marks. One of the advantages of the present invention is that the strain-sensing devices are arranged so that they automatically provide for correct gauge length and, indeed, bench marks need not be placed on the specimen.

This automatic gauge length setting is brought about as follows. In sensing device 13 the point of clamping, i. e., the line contact made by clamping plate 52, is arranged at a known distance from the surface 23. Likewise, the point of clamping on equalizing bar 14 is arranged at a known distance from surface 22. The surfaces 22 and 23 are ground or machined so that whenever they are in abutting relationship as shown in Figure 1, the points of contact on each clamp are separated by a known distance. This is the gauge length and is represented by the letter $d$ in Figure 1.

The concept of clamping the strain-sensing devices to the specimen so that they move therewith during elongation is important in the invention because exact strain-following is obtained and this is conducive to accurate test results. Further, the arrangement makes the testing procedure largely independent of the skill of the operator and the advantage of this will be appreciated by comparison with those strain-measuring devices where bench marks are provided on the specimen and an operator is required to make trammel bars follow the marks. This, of course, requires considerable visual and mechanical skill.

The amount of elongation or strain is measured by a mechanism generally indicated by 60 in Figure 7, and this mechanism is actuated by flexible drive means connected to the sensing devices. The flexible drive means will next be described.

In Figure 1 the equalizing bar 20 has two pins 61 and 62, which are respectively connected to the flexible chains 63 and 64, which extend upwardly and over the pulleys or sprockets 65 and 66 and thence downwardly, where they are connected to pins 70 and 71 on the weight 72. The equalizing bar 15 has two pins 73 and 74 which are respectively connected to the flexible chains 75 and 76, which extend upwardly and over the pulleys or sprockets 80 and 81 and thence downwardly, where they are connected to the pins 82 and 83 on the weights 84 and 85.

It will be apparent that when the sensing devices 13 and 14 are moved apart by the elongation of the specimen, the motion causes movement of the chains, which, in turn, causes rotation of the respective pulleys. The sensing devices and the associated chains and weights are arranged so that the effective mass on either side of the pulleys (as viewed in Figure 2) remains substantially the same for a reasonably large elongation. The reason for this is so that no spurious loads or stresses will be imposed on the specimen as elongation takes place.

Figure 9:
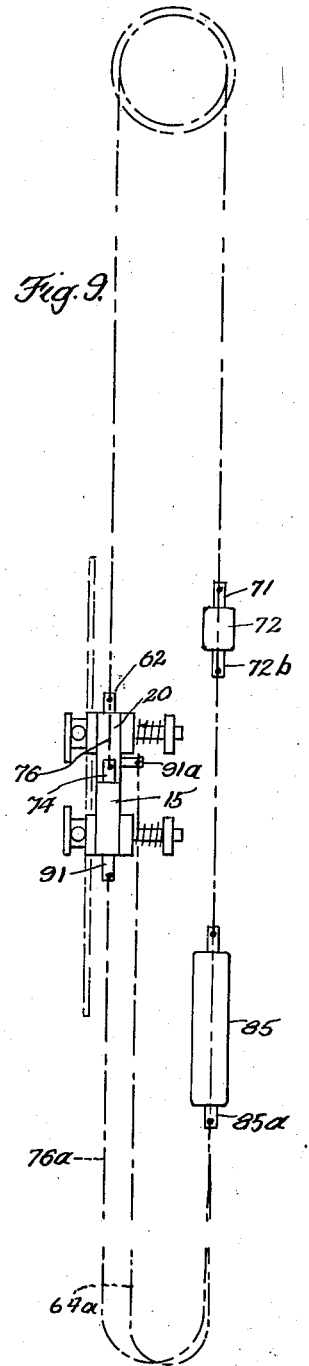

In the above construction, the chains are arranged in a discontinuous fashion. In some instances, particularly where very long total elongations are involved, the chains may be arranged in continuous fashion by adding an appropriate loop extending downwardly between the weights and sensing devices (Figures 8 and 9). In such an embodiment, the lower ends of the weights 84 and 85 are provided with pins 84a and 85a and the bar 15 is provided with pins 90 and 91. The loop 75a is hung from the pins 84a and 90. The loop 76a is hung between the pins 85a and 91. Similarly, the weight 72 is provided with pins 72a and 72b and the bar 20 is provided with pins 90a and 91a. The loop 63a extends between the pins 72a and 90a and the loop 64a extends between the pins 72b and 91a. It will be noted that the connection to the bar 20 is arranged so that the lower part of the chains 63a and 64a "clear" the bar 15 since the pins 90a and 91a on the bar 20 extend rearwardly. As an alternative to the rearwardly extending pins, the bar 15 may be provided with apertures permitting the free running of the chains 63a and 64a.

The use of the flexible drive in the form of chains between the sensing devices and the measuring mechanism is important for several reasons.

In testing of the kind in question, it is important that no loads or stresses be imposed on the specimen other than that imposed by the testing mechanism in moving the movable crosshead of the machine. Inasmuch as the sensing devices are secured to the test specimen, this weight, especially if highly accurate results are required, should be substantially counteracted or balanced out. The flexible drive provides an ideal vehicle for this purpose inasmuch as weights can be attached to the drive opposite the sensing devices. Furthermore, if, during the test, there is any tendency of the specimen to twist, no spurious loads will be imposed because the flexible chains will allow the sensing device to swing in response to the twisting.

Another advantage of the flexible drive is that the driving function is continuous even though the specimen is to be elongated to very large amounts.

Also, the above advantages of the flexible drive are obtained even though a measuring mechanism other than that to be described hereinafter is used.

The details of the preferred form of measuring mechanism will next be described.

As seen in Figure 3, a bracket 92 has a C-shaped support 93 connected thereto as by screws 94—94. One leg of the support is indicated at 95. Both of the legs have slots, the slot of leg 95 being indicated by 96. The slots are adapted to be fitted over the rod 3 and secured thereto by the plate 100 held on the support 93 as by screws 101—101.

Also mounted on the bracket are the supports 102 and 103, which are secured thereto as by the screws 104—104. These supports mount the bearings 105 and 106. Each bearing supports a hollow, shaft-like member generally indicated at 110. The shaft carries the nuts 111 and 112, which may be brazed or sweated thereto. The pulleys 65 and 66 are secured on the shaft by set screws 65′ and 66′. As seen in Figures 1 and 2, the bracket 92 carries two shrouds 113 and 114, which are attached to the bracket by screws, the screw for the shroud 114 being indicated by the numeral 115 in Figure 2. The purpose of these shrouds is to prevent the chains from flying off the pulleys in the event a specimen breaks during a test.

Within the shaft 110 is disposed a shaft 120, which is provided with a pair of screws 121 and 122, which respectively operate in the nuts 111 and 112. On the left-hand end of the shaft 120 is the pulley 80, held thereon as by pin 80′. On the right-hand side of the shaft is the pulley 81, secured thereto as by the pin 81′. On the right-hand side of the bracket 92 is a support block 123, secured thereto as by the bolts 124—124 (see Figure 2). In this block is disposed the housing 125 of a signal generator 126 and the housing is held in the block by the strap 130 secured to the block as by the screws 131—131.

Preferably the signal generator takes the form of a differential transformer, the primary and secondary coils of which are generally indicated by 132. The core of the transformer is indicated by 133 and is mounted on a stem 134 secured to the shaft 120 as by the coupling 135.

The transformer is adapted to develop a voltage corresponding to the strain of the specimen and this signal may be used to drive an indicator or a drum of a recorder when a stress-strain curve is to be made. A recorder for this purpose is shown in my copending application, Serial No. 261,239, filed December 12, 1951, entitled Recording Device for Use in Conjunction With Testing Machines and assigned to the assignee of the present invention, said application being issued on November 5, 1957 as Patent No. 2,812,229.

The transformer develops a signal by the axial displacement of the core 133 and the manner in which the core is displaced is explained following.

As mentioned above, the movement of the sensing devices causes the movement of the respective chains, which effects rotation of the pulleys 80 and 81 and hence, the shaft 120. Rotation of the pulleys 65 and 66 effects rotation of the nuts 111 and 112.

In Figure 7 the position of the sensing devices at the start of a testing operation is indicated by 13 and by 14, and the position during some part of the test, by 13′ and 14′. It will be observed that both of the devices are moved downwardly by the elongation of the specimen portions 12a and 12b while, at the same time, the devices are relatively moved apart by the elongation of the portion 12. The total movement of the device 13 is represented by $d_1$ and the total movement of the device 14, by $d_2$. Thus, the chains connected with the devices move in the same direction (downwardly) but at different rates.

The pulleys 65 and 66, hence, nuts 111 and 112, are rotated clockwise as viewed from the left in Figure 3. Also, the pulleys 80 and 81 move the screws 121 and 122 clockwise. However, the nuts and the screws are rotated at different speeds. Rotation of the nuts and the screws in the same direction but at different speeds causes the shaft 120, hence, the core 133, to be displaced. Since the rotation is clockwise, the shaft and the core are displaced to the right.

The differential action of the mechanism 60 is of important advantage in testing work of the kind in question because the movement of the transformer core can be small, even for a very large movement of the sensing devices. For example, in one embodiment of the invention, the core was displaced .150 inch for a final spacing between the sensing devices of 20 inches.

Other forms of devices for measuring may be used. For example, a cam may be rotated by a shaft corresponding to 120, the cam having a follower which displaces the core of a differential transformer. Another cam may be rotated by a shaft corresponding to shaft 110, the cam having a follower which moves the core of a differential transformer. The secondaries of the transformers can be connected in series opposing and the resulting signal be a function of the differential motion of the two cores. The first-described arrangement, however, is preferred because of economy, compactness and simplicity of construction, and because of the advantage of small core displacement as mentioned above.

A form of signal generating means other than that of a differential transformer may be used. For example, the core may be a permanent magnet displaceable to develop a signal in a coil. However, the differential arrangement is preferred because of excellent linearity and because it is useful in cyclic testing, for example, where a specimen is expanded and contracted.

I claim:

1. In instrumentation for the strain testing of rubber or the like: a pair of strain-sensing elements each respectively adapted to be fixedly attached to and movable in accordance with the strain of a test specimen, each element having a member which extends across the specimen and projects outwardly from the opposite sides thereof; mechanism operative to measure said strain in accordance with the movement of said elements; a first pair of flexible elements respectively connected to the opposite sides of one of said members and connected for driving engagement with said measuring mechanism; and a second pair of flexible elements respectively connected to the opposite sides of the other of said members and connected for driving engagement with said measuring mechanism.

2. A construction in accordance with claim 1, further including means connected to said flexible driving elements for counteracting the weight of the sensing elements when the same are attached to a test specimen.

3. In instrumentation for the strain testing of rubber or the like: a pair of strain-sensing members each respectively adapted to be fixedly attached to and movable in accordance with the strain of a test specimen; mechanism to measure said strain including electrical signal generating means to develop a signal in accordance with said strain and two rotatable elements, the rotation of which effects the operation of the signal means; and means to drive said rotatable elements including flexible interconnections between one of the sensing members and one of said elements and between the other of said sensing members and the other of said elements.

4. A construction in accordance with claim 3 wherein said flexible interconnections are arranged in a continuous loop form.

5. A construction in accordance with claim 3 wherein said flexible interconnections are arranged in discontinuous form.

6. A construction in accordance with claim 3 wherein said signal means includes at least a coil and a movable core connected to one of said movable elements.

7. A construction in accordance with claim 3 wherein the sensing members are constructed for automatic setting of specimen gauge length.

8. In instrumentation for the strain testing of rubber or the like: a pair of clamps each adapted to be fixedly attached to and movable in accordance with the strain of a test specimen; strain-measuring mechanism including a nut element and a screw element relatively rotatable with respect to one another whereby differential rotation causes displacement of one of the elements; first flexible driving interconnections between one of said clamps and said nut element for causing rotation of the nut element with movement of the clamp; and second flexible driving interconnections between the other of said clamps and said screw element for causing rotation of the screw element with the movement of the clamp.

9. A construction in accordance with claim 8 wherein said differential rotation causes displacement of said screw element.

10. In instrumentation for the strain testing of rubber or the like: a pair of strain-sensing members each having an equalizing bar and a clamp thereon adapted to fixedly attach the member to a specimen whereby to be movable in accordance with the strain of the specimen; two commonly connected rotatable nuts each having a sprocket connected therewith; a shaft having a pair of screws respectively operating in said nuts and having two sprockets connected therewith; a coil and a core, the core being connected with said shaft and displaceable thereby; a first pair of flexible chains respectively connected to opposite ends of one of said equalizing bars and to the sprockets on said nuts; and a second pair of flexible chains respectively connected to opposite ends of the other of said equalizing bars and to the sprockets on said shaft.

11. A construction in accordance with claim 10 further including shroud means disposed over said sprockets and adapted to prevent disengagement of the chains therefrom when a specimen breaks during a test.

12. A construction in accordance with claim 10 wherein said first and second pairs of chains are each discontinuous and further including weight means for balancing the respective sensing members.

13. A construction in accordance with claim 10 wherein said first and second pairs of chains are each continuous and further including weight means for balancing the respective sensing members.

14. A construction in accordance with claim 10 wherein said sensing members are constructed for automatic setting of the specimen gauge length.

15. In instrumentation for the strain testing of rubber or the like: a bracket adapted to be mounted on the crosshead of a testing machine; a pair of nuts each rotatably mounted on said bracket and joined together for rotation in unison; a shaft having a pair of screws respectively operatively connected with the nuts; a pair of drive pulleys respectively connected with said nuts; a second pair of drive pulleys connected with said shaft; a coil connected with said bracket; and a core associated with the coil and connected with the shaft whereby to be displaced thereby.

16. A construction in accordance with claim 15 wherein the nuts are arranged on a common shaft and said shaft is disposed therein.

References Cited in the file of this patent

UNITED STATES PATENTS

| | | |
|---|---|---|
| 1,054,335 | Brown | Feb. 25, 1913 |
| 2,380,990 | Paul | Aug. 7, 1945 |
| 2,578,066 | Hyde | Dec. 11, 1951 |
| 2,600,923 | Rogers et al. | June 17, 1952 |
| 2,677,187 | Buist et al. | May 4, 1954 |

FOREIGN PATENTS

| | | |
|---|---|---|
| 527,893 | Germany | June 22, 1931 |
| 122,307 | Great Britain | Jan. 23, 1919 |